Aug. 30, 1966     J. C. ENGSTRAND     3,269,697

PLUG VALVES

Filed Dec. 9, 1963

John C. Engstrand
INVENTOR.

BY
Stevens, Lehrer & Stevens
Attorneys.

United States Patent Office 3,269,697
Patented August 30, 1966

3,269,697
PLUG VALVES
John C. Engstrand, Chicago, Ill.
(439 Gordon St., Calumet City, Ill.)
Filed Dec. 9, 1963, Ser. No. 329,135
1 Claim. (Cl. 251—183)

My invention relates to valves used for controlling the passage of gas or water in pipes, and commonly known as plug valves. In this type of valve the stem has a conical enlargement or plug inside the valve housing; and the latter contains a seat in which the plug fits. The plug and seat are machined or ground in a manner to procure sealed engagement; and the valve stem issues from the bottom of the valve housing to receive securing means designed to exert a downward pull on the stem in order to maintain the plug in properly seated position, whereby to seal the valve against leakage.

It is conceivable, when a valve of the above type is new, that the stem-securing means may be adjusted— usually at the factory in which the valve is manufactured—to seat the valve plug firmly, yet permit the stem to be turned without difficulty when the valve is to be operated. However, as the valve plug settles more snugly in its seat from the wear it receives during use, the grip of the stem-securing means below becomes relaxed, affording a degree of play between the plug and its seat, which is manifested by leakage of the medium controlled by the valve. When this is discovered, a take-up adjustment of the stem-securing means is usually made. However, what may be considered as a full or efficient take-up of the play in the valve to stop it from leaking often results in a stiffening or tightening of the stem, so that the valve handle is hard to turn. On the other hand, imparting a lesser take-up to make the valve easier to turn usually means that a slight amount of play still exists in the valve, and that it may continue to leak, although to a lesser extent than before. The condition described indicates that conventional valves are subject to leakage with use, and that adjustments to overcome leakage create difficulty in the operation of the valve.

In dealing with the above situation, it is one object of the present invention to provide a stem-controlling device for valves which takes up play automatically in the seating of the plug, whereby to avoid valve leakage at all times.

A further object is to provide a device of the above character which normally draws on the valve plug sufficiently to keep it seated, but not so tightly that it is difficult to turn the handle of the valve.

Another object is to construct the stem-controlling device with a metallic closure which provides a bearing for the rotary function of the stem, and a stopper-like and yieldable final closure which serves both as a seal and as a control for the seating of the valve plug.

An additional object is to design the device as a neat extension of the valve which is protected from dust and injury by external objects.

A better understanding of the invention may be had by reference to the accompanying drawing, in which—

Figure 1:
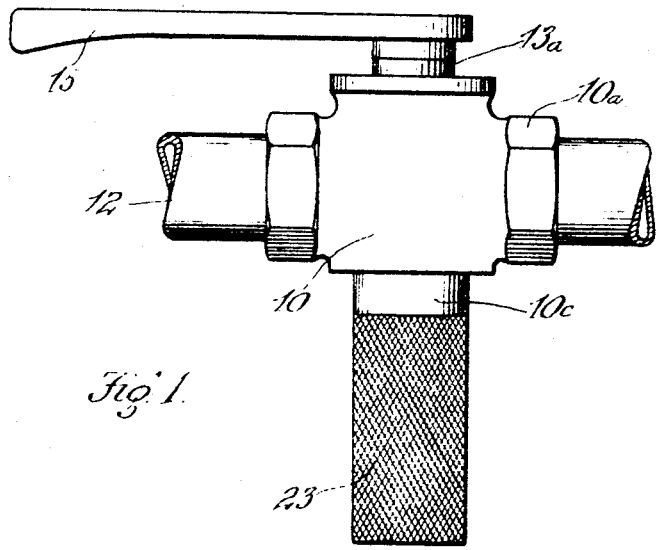
FIG. 1 is an elevation of the improved valve.

Referring specifically to the drawing, 10 denotes the housing of the valve; and the latter has the usual hexagonal end receptacles 10a for receiving pipe sections 12 connected by the valve. The interior of the latter is standard, containing a seat 10b for a conical plug 13. Above the housing the plug extends with a neck 13a receiving the valve operating handle 15; and the plug is reduced below with a cylindrical stem 13b which issues from the housing in downward direction.

For the purpose of the invention, the stem 13b passes through an extension 10c of the housing, the form of the extension preferably being circular; and the extension terminates with a threaded nipple 10d.

On issuing from the nipple 10d, the stem 13b first receives a cylindrical sleeve 17 with a close sliding fit, the leading end 17a of the sleeve being conically beveled to fit a seat 10e of similar form made in the mouth of the nipple 10d.

Figure 2:
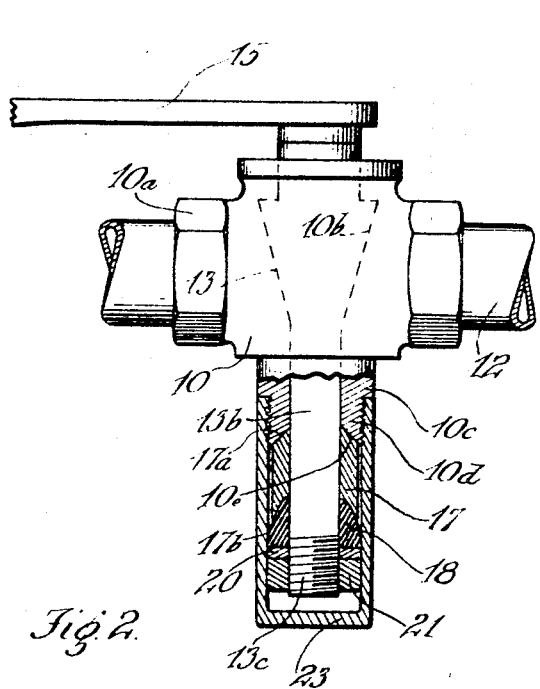
FIG. 2 is a similar view, partly broken away to show the stem-controlling device in assembled position.
Figure 3:
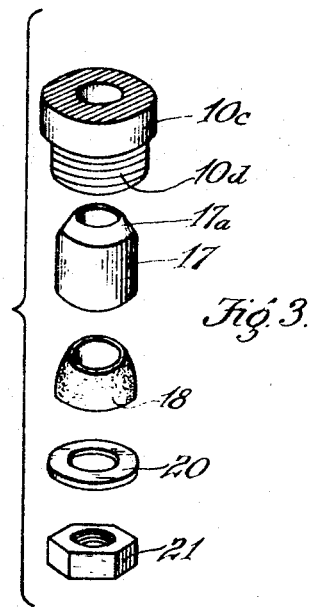
FIG. 3 is a group perspective view of the parts of the device in the order of assembly.

The stem 13b next receives a ring 18 of rubber or like yieldable material, the ring being nose-shaped toward its leading end. The latter is adapted to seat snugly in an annular pocket 17b made in the outer end of the sleeve 17, such pocket having a profile similar to that of the ring. The remainder of the stem 13b is made with a thread, as shown at 13c, first receiving a metal washer 20, and finally a nut 21. The seating of the ring 18 in the sleeve pocket 17b is induced by the advance of the nut 21. The assembly just described is protected against dust and injury from external objects by the application of a deep screw-cap 23 to the nipple 10d as shown in FIG. 2, whereby to fully enclose the assembly; and the screw-cap is preferably knurled, as shown in FIG. 1, to afford a manual grip when the cap is to be removed or replaced. The cap 23 as seen in FIG. 1, includes an intermediate surface portion engaged by the outer periphery of the resilient ring 18 whereby compression of the ring 18 by tightening the fastening means 21 concentrates pressure at the tapered nose of the yieldable ring within the annular pocket 17b and also provides a seal below the sleeve 17. Further, the cap 23 provides means for retaining the fluid in the event the seal forms a leak.

The function of the device just described is primarily to draw upon the stem 13b with the effect of maintaining the plug 13 in the seated position and preventing leakage by way of the valve. Further, when the nut 21 is advanced to put the rubber ring 18 under pressure, such pressure is transmitted through the ring 18 against the nipple 10d with the effect of drawing the stem 13b in outward direction to automatically take up any play that may have developed between the plug 13 and its seat. The present device thus maintains the plug in the seated position without any further adjustment or take-up of the nut 21.

Since the pressure of the rubber ring 18 is directed toward the nipple 10d in order to draw outwardly on the stem 13b, as just stated, such pressure would cause undue wear of the ring by the end of the nipple in case the sleeve 17 were not present, because of the turning movements of the stem and ring during the use of the valve. One function of the sleeve 17 is, therefore, to serve as a metallic intermediary between the ring and the nipple, and use the latter as a bearing in which the sleeve may rotate without appreciable wear. In fact, such wear as might occur in this area would be taken up automatically by the action of the rubber ring, as described previously in respect to the valve plug. While a butt-end engagement could be made for the sleeve and the nipple, the conical joint employed has the advantage of providing a seal, in order to keep back such leakage as may seep through the meeting area of the nipple and sleeve, whether the stem and sleeve are stationary or being turned.

The rubber ring 18 also serves to seal the stem to the sleeve. Thus, the compression of the ring by the advancing adjustment of the nut 21 packs the ring against the stem, maintaining a seal between the component parts.

It is now apparent that the novel stem-control device provides an attachment for the stem which primarily draws on it to keep the valve plug seated, and includes an automatic take-up as wear or play develops. This means that the initial adjustment of the nut 21 suffices to keep the valve in proper condition for a long period of use. However, it is a simple matter to advance the nut in case the valve has received so much wear that the pressure of the rubber ring has lessened. Further, the sleeve 17 is an element which—like the rubber ring 18—always turns with the stem, receives no appreciable wear, and creates a seal with the valve body while still or in turning action. A valve is thus had which is self-sealing, operable at all times without difficulty, and readily adjustable in case it wears over a long period of use.

While I have described the invention along specific lines, various minor changes or refinements may be made herein without departing from its principle, and I reserve the right to employ all such changes and refinements as may fall within the scope and spirit of the appended claim.

I claim:

In a plug valve for controlling the flow of fluids and including a housing having a passage therethrough, and a plug journaled in said housing in intersecting relation to said passage for controlling fluid-flow therethrough, the improvement comprising: an elongated stem projecting axially from the axis of rotation of said plug; said housing including an integral annular extension depending from said housing and circumposed about an intermediate portion of said stem, said extension terminating in a lower, annular, beveled seat diverging from the inner to the outer surface of said extension; a sleeve circumposed about said stem and having an end portion complementary to and rotatably and sealingly engaged on said beveled seat, said sleeve including an annular pocket at the other end thereof and disposed intermediately of said stem, said annular pocket converging from the outer to the inner surface of said sleeve and terminating at the outer surface of said stem; a yieldable ring circumposed about said stem and having at one end an annular tapered nose portion complementary to said annular pocket and snugly received therein; a washer element circumposed about said stem and engaging the other end of said yieldable ring; a fastener element adjustably secured on said stem and clampingly engaging said washer and applying axial force to said resilient ring, said sleeve, and said plug; said ring and sleeve being rotatable as a unit with said stem and the resilient ring automatically compensating for wear, the sleeve end portion providing a sealing bearing at said beveled seat of said extension, said extension comprising a lower nipple portion; an elongated cap removably engaged on said nipple portion and sealingly enclosing said sleeve, yieldable ring, washer and fastening element and having an intermediate inner surface portion sealingly engaged by an outer peripheral surface of said yieldable ring, whereby compression of said yieldable ring concentrates axial pressure at said tapered nose portion and urges the same into sealed relation about the outer surface of said stem.

References Cited by the Examiner

UNITED STATES PATENTS

| 512,537 | 1/1894 | Campbell | 251—181 |
| 2,412,597 | 12/1946 | Brewer | 251—181 |
| 2,749,084 | 6/1956 | Townsend | 251—183 |
| 2,876,985 | 3/1959 | Birchall | 251—181 X |
| 3,160,388 | 12/1964 | Marentette | 251—183 |

FOREIGN PATENTS

| 194,642 | 1/1908 | Germany. |
| 355,922 | 1/1923 | Germany. |
| 124,829 | 3/1928 | Switzerland. |

WILLIAM F. O'DEA, *Primary Examiner.*

ISADOR WEIL, MARTIN P. SCHWADRON,
*Examiners.*

H. WEAKLEY, *Assistant Examiner.*